Oct. 25, 1927.
E. L. CROSWELL
1,646,445
AUTOMOBILE DIRECTION INDICATOR
Filed Feb. 9, 1926
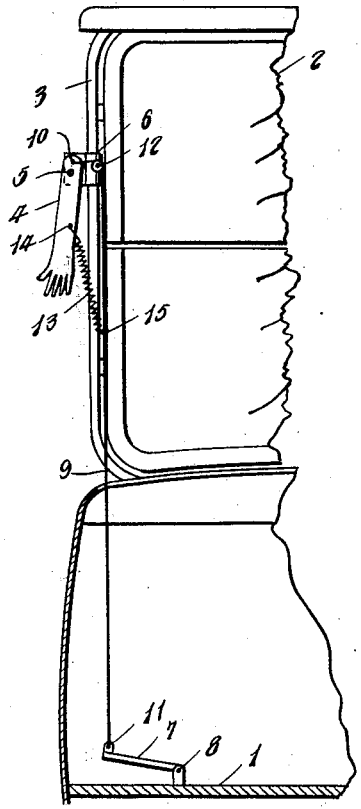
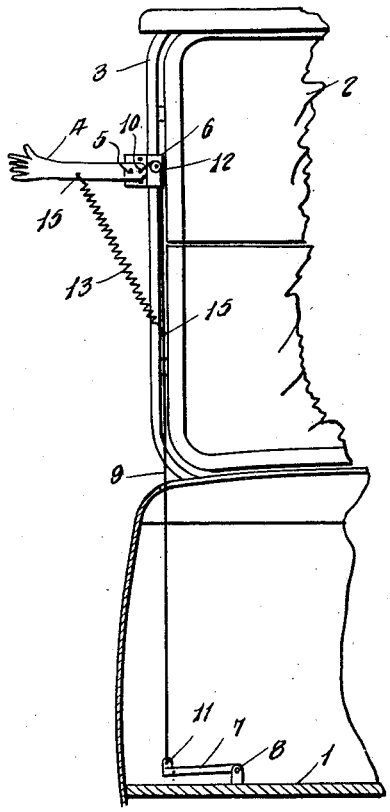
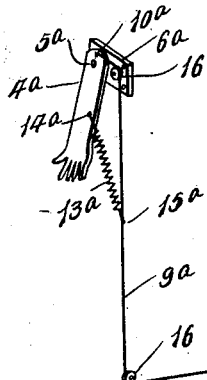
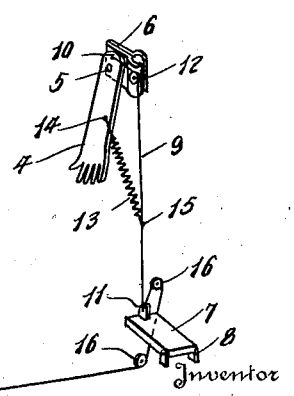
Inventor
E. L. Croswell.
By
Attorney Patented Oct. 25, 1927.

1,646,445

UNITED STATES PATENT OFFICE.

ERNEST L. CROSWELL, OF CHICAGO, ILLINOIS.

AUTOMOBILE DIRECTION INDICATOR.

Application filed February 9, 1926. Serial No. 87,102.

This invention relates to automobile direction indicators or signals, and has for one of its objects to improve and simplify the general construction of devices of this character and to provide one embodying a pivoted indicating or signalling member that may be readily swung from a normally inoperative to an operative position by the pressure of the foot on a pedal connected to the member by a wire or other flexible element, and a spring connected to the element and member for the purpose of limiting the movement of the member into operative position without placing strain on the support of the member.

With the foregoing and other objects in view, the invention consists of the novel construction, combination and arrangement of parts hereinafter fully described and claimed, and illustrated in the accompanying drawing, wherein:

Figure 1 is a view illustrating the application of the direction indicator or signal, the same being shown in inoperative position.

Figure 2 is a similar view illustrating the indicating or signalling member in operative position, and Figure 3 is a perspective view illustrating a slightly modified form of the direction indicator or signal.

Corresponding and like parts are referred to in the following description, and designated in the several views of the accompanying drawing, by similar reference characters.

In the drawing, 1 designates the front floor boards, 2 the windshield, and 3 one of the windshield supporting bars of an automobile.

The direction indicator or signal comprises a direction indicating or signalling member 4 which is pivotally supported adjacent one end and the other end of which is preferably in the form of a hand with outstretched fingers. The pivot 5 for the member 4 is carried by a bracket 6 secured to the windshield supporting bar 3. A pedal 7 is pivoted at one end as at 8 to the floor board 1 within convenient reach of the driver, and a wire 9 or other suitable flexible element is secured as at 10 to the pivoted end of the member 4 and as at 11 to the free end of the pedal 7. The part 9 passes over a guide or direction pulley 12 journaled on the bracket 6. An expansion spring 13 is secured as at 14 to the member 4 and as at 15 to the part 9, the spring being connected to these parts at points centrally between their ends.

As shown in Figure 3, the device may embody a second indicating or signalling member $4^a$ which is pivoted as at $5^a$ at the rear of the automobile. This member $4^a$ is connected to the part 9 for simultaneous operation with the member 4 by means of a wire or other flexible element $9^a$ which passes over guide or direction pulleys 16 journaled on the automobile. An expansion spring $13^a$ is connected to the parts $4^a$ and $9^a$ as at $14^a$ and $15^a$, respectively.

The indicating or signalling member or members normally occupy a downwardly extending or non-indicating or non-signalling position, and is or are adapted to be swung from this to a horizontal or substantially horizontal indicating or signalling position. When the member or members is or are in the latter position, it or they will indicate to the traffic that the driver of the automobile intends to make a turn, and it or they can be swung into and held in this position by depressing and holding the pedal 7 in depressed position. When the pedal 7 is released, the member or members will gravitate into normal or non-indicating or non-signalling position. The movement of each indicating or signalling member from non-indicating or non-signalling to indicating or signalling position, will be limited by the spring in such a manner as to prevent any injury to the parts of the device, and each member is held by its spring against casual outward movement when in non-indicating or non-signalling position.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. An automobile indicating or direction signal, comprising an indicating or signalling member pivoted adjacent one of its ends and normally occupying a depending position, a pedal pivoted at one end below the pivot of the member, a guide pulley journaled adjacent the pivot of the member, a flexible element passing about the pulley and connected to the member above the pivot thereof and to the free end of the pedal, and an expansion spring connected to the member below the pivot thereof and to the element below its connection with the member.

2. An automobile indicating or direction signal, comprising indicating or signalling members each pivoted adjacent one end and normally occupying a depending position, guide pulleys journaled adjacent the pivots of the members, other guide pulleys journaled at points remote from the pivots of the members, a pedal, a flexible element connected to one of the members and pedal, a second flexible element connected to the other member and pedal, said elements passing about the guide pulleys and connected to the members at points above the pivots of said members, and springs connected to the members below the pivots thereof and to the elements below their connection with the members.

In testimony whereof I affix my signature.

ERNEST L. CROSWELL.